(12) United States Patent
Beistegui Chirapozu

(10) Patent No.: US 11,459,056 B2
(45) Date of Patent: Oct. 4, 2022

(54) HEADSET ASSEMBLY SYSTEM FOR A BICYCLE

(71) Applicant: BH BIKES EUROPE, S.L., Vitoria (ES)

(72) Inventor: Jose Luis Beistegui Chirapozu, Vitoria (ES)

(73) Assignee: BH BIKES EUROPE, S.L., Vitoria (ES)

( * ) Notice: Subject to any disclaimer, the term of this patent is extended or adjusted under 35 U.S.C. 154(b) by 136 days.

(21) Appl. No.: 17/136,748

(22) Filed: Dec. 29, 2020

(65) Prior Publication Data

US 2021/0300501 A1    Sep. 30, 2021

(30) Foreign Application Priority Data

Mar. 24, 2020   (ES) ................................ ES202030242

(51) Int. Cl.
   *B62K 21/16*      (2006.01)
   *B62K 21/18*      (2006.01)
   *B62J 11/10*      (2020.01)
(52) U.S. Cl.
   CPC .............. *B62K 21/16* (2013.01); *B62K 21/18* (2013.01); *B62J 11/10* (2020.02)
(58) Field of Classification Search
   CPC ........... B62K 21/16; B62K 21/18; B62J 11/10
   USPC ....................................................... 280/263
   See application file for complete search history.

(56) References Cited

U.S. PATENT DOCUMENTS

| 5,536,104 | A  | * | 7/1996  | Chen ...................... | B62K 21/18 403/370 |
| 7,645,087 | B1 | * | 1/2010  | Lin ......................... | B62K 21/18 403/109.5 |
| 7,654,547 | B2 | * | 2/2010  | Bouchez ................ | B62K 21/18 280/279 |
| 7,757,582 | B2 | * | 7/2010  | Kua ........................ | B62M 25/04 74/551.8 |
| 8,181,980 | B1 |   | 5/2012  | Moore | |
| 9,475,534 | B2 | * | 10/2016 | Gibson ................... | B62K 21/18 |
| 9,615,472 | B1 | * | 4/2017  | Calfee .................... | B62K 11/14 |
| 10,023,257 | B2 | * | 7/2018  | Lin .......................... | B62J 23/00 |
| 10,197,049 | B2 |   | 2/2019  | Staples | |

(Continued)

FOREIGN PATENT DOCUMENTS

DE           19940969 A1 * 11/2000  ............. B62K 21/02
EP           3186522 B1      9/2019

*Primary Examiner* — Kevin Hurley
*Assistant Examiner* — Hosam Shabara
(74) *Attorney, Agent, or Firm* — Lucas & Mercanti, LLP

(57) ABSTRACT

A headset assembly system for a bicycle is provided having a handlebar stem (1), radially fastenable by tightening to a fork tube (2), rotatable by headset bearings (7) with respect to a head tube (3) wherein the headset bearings are fastened (7); a retaining flange (4), radially fastenable by tightening to the fork tube (2); a thrust ring (5), axially movable along the fork tube (2); such that the retaining flange (4) and the thrust ring (5) are configured to contact each other by a ramp (6) which relates a rotation with a movement relative to each other; the thrust ring (5) is arranged such that, when the thrust ring (5) is rotated around the fork tube (2) with the retaining flange (4) fastened to the fork tube (2), the thrust ring (5) moves with respect to the retaining flange (4) pushing the stem (1) against the headset bearings (7).

8 Claims, 5 Drawing Sheets

(56) References Cited

U.S. PATENT DOCUMENTS

| | | | | |
|---|---|---|---|---|
| 2006/0038376 A1* | 2/2006 | Okajima | ............... | B62K 21/18 |
| | | | | 280/276 |
| 2015/0259022 A1* | 9/2015 | Nago | ................. | B62K 21/12 |
| | | | | 74/551.1 |
| 2021/0371041 A1* | 12/2021 | Liu | ..................... | B62K 21/18 |
| 2021/0394849 A1* | 12/2021 | Liu | ..................... | B62K 21/18 |

* cited by examiner

HEADSET ASSEMBLY SYSTEM FOR A BICYCLE

CROSS REFERENCE TO RELATED APPLICATION

This application claims the benefit of priority from Spanish patent application 202030242 filed Mar. 24, 2020, the contents of which are incorporated herein by reference.

TECHNICAL FIELD

The present invention relates to the bicycle industry, and more specifically to the assembly of the headset of a bicycle.

STATE OF THE ART

In the assembly of the headset of a bicycle, the fork tube of the bicycle is inserted into the head tube of the bicycle using bearings of the headset in casings or directly integrated both in the upper portion and in the lower portion of the head tube in order to enable the rotary movement between the head tube and the fork tube. In order to subsequently install the fork tube on the head tube, the stem connects the fork tube to the handlebar. The problem with this assembly arises in the fastening of the headset, wherein there is a movement play of the bearings which is produced between the stem and the head tube since said bearings are embedded in the head tube. Therefore, the pressure exerted manually with the stem is not enough to compress the bearings and then fasten said stem in the head tube without said bearings of the headset moving. Consequently, the adjustment is not precise, leaving play or clearance which transmits vibrations to the user, providing an uncomfortable and unsafe bicycle.

Currently there are different methods of assembling the headset of the bicycle in order to eliminate such clearance. The conventional system uses star nuts such as described, for example, in patent document U.S. Pat. No. 8,181,980 B1 wherein star nuts are inserted with pressure into the fork tube and a cap is screwed on by means of a bolt which presses on the stem or directly on the bearings in order to eliminate the clearance, compressing the entire headset system. This configuration requires the use of additional elements such as a hammer in order to insert the star nuts into the fork tube, which can also damage the tube with the pressure produced in the walls thereof. Furthermore, another disadvantage of this system is that the passage through the fork tube is obstructed, which prevents the installation of cables or the housing of tools so that they are protected from dirt and damage, such as when they are assembled on the bicycle frame, from which they can fall.

With the aim of leaving the fork tube free of obstruction to be used as storage or to include cabling, there are other systems that are limited to performing threading inside of the fork tube in order to install a threaded cap which will put pressure on the stem or directly on the bearings in order to eliminate the clearance. In this manner, a valid device is used for storing tools which can be housed in the fork tube and be fastened in the threaded cap which is threaded in the fork tube in order to press on the stem and eliminate the clearance. However, the disadvantage of this system is that a special tool is necessary in order to perform the threading inside of the fork tube, in addition to the fact that when the threading is performed the warranty of the bicycle is lost and the fork tube is weakened, providing a bicycle that is not as safe. An example of this device is the one disclosed in patent document U.S. Pat. No. 10,197,049.

Another system used to fasten the fork tube to the head tube, eliminating the clearance, is the use of a mechanism which is fastened in the fork tube between the head tube and the stem, the latter being initially fastened to the fork tube. The mechanism has two rings, one being fastenable and the other movable by torsion. Thus, the rings have projections on the faces thereof facing each other with at least one projection sloping upward. With the torsion of the lower ring, it moves axially towards the head tube, producing the compression and eliminating the clearance in the headset. This system is described, for example, in patent document EP3186522.

The disadvantages of this system are that the screw that applies force for the torsion of the lower ring will be what supports all the stress of the headset assembly, and by being so small it may fail and therefore will return the assembly to the position with clearance. Likewise, it does not enable cables to be integrated since the routing of cables that come from the bicycle frame is normally done just below the stem. The rings would not enable the cables to pass through since they are fitted on the fork tube.

In light of the described disadvantages or limitations of the solutions existing currently, a solution is necessary which enables the clearance of the headset to be eliminated, while enabling the integration of cables and the insertion of a multi-tool device in the fork tube without requiring any alteration thereof.

SUMMARY OF THE INVENTION

In order to meet this objective and solve the technical problems discussed so far, in addition to providing additional advantages that may be derived later, the present invention provides a headset assembly system for a bicycle comprising a handlebar stem, radially fastenable by tightening to a fork tube which is rotatable by means of headset bearings with respect to a head tube wherein the headset bearings are fastened; a retaining flange, radially fastenable by tightening to the fork tube; a thrust ring, axially movable along the fork tube; such that the retaining flange and the thrust ring are configured to contact each other by means of at least one ramp which relates a rotation with a movement relative to each other; wherein the thrust ring is arranged such that, when the thrust ring is rotated around the fork tube with the retaining flange fastened to the fork tube, the thrust ring moves with respect to the retaining flange pushing the stem against the headset bearings. Another object of the invention is a bicycle comprising said headset assembly system.

Thanks to this configuration, it is possible to securely fasten the headset of the bicycle by acting on the thrust ring applying compression to the headset, in order to subsequently completely fasten the stem once the clearance has been eliminated. In this manner, the fastening will be supported by the stem which has a larger contact surface with the fork tube and two screws instead of a single small screw used to exert the torsion, said small screw being what supports all the stress in the known embodiments. With the system object of the invention, the screw which actuates the torsion can be loosened since the pressure is exerted by the stem, although it would provide an additional stress which provides more security to the system. Furthermore, it could be tightened again by pushing the stem if a new clearance had been produced as a result of an impact or similar.

Likewise, with this assembly system the fork tube is left free of obstruction enabling it to be used for the inclusion of cables, and for the integration of a multitool, without interfering with the headset or requiring any alteration in the fork tube, headset or bicycle frame.

An assembly system applicable to any bicycle is achieved, being a system that is versatile and easy to install by the user himself, facilitating assembly and disassembly, and enabling access to the inside of the fork tube if it is necessary to use the multi-tool device.

Preferably, the assembly system comprises the thrust ring fitted inside the stem in contact with a fitting stop. And even more preferably, the retaining flange is also arranged fitted inside of the stem. In this manner, the mechanism will be completely hidden and perfectly integrated inside of the stem. A better aesthetic effect is achieved wherein the entire system is integrated into the stem and is not visually visible as in known embodiments, in addition to protecting both the ring and the retaining flange from dirt and deterioration.

According to one aspect of the invention, the stem has an adjustment hole in order to act in the rotation of the thrust ring, such that the thrust ring can be accessed with a screw in order to act on a radial projection of the thrust ring and cause the rotation thereof.

Likewise, in order to access the retaining flange, there is a fastening hole in the stem for the threaded fastening of the retaining flange in the fork tube.

According to an additional feature of the invention, the stem of the headset assembly system comprises holes for the threaded fastening of the stem to the fork tube, preferably in opposite positions at different heights. This configuration gives the system greater resistance to stress, having a larger grip surface and distributing the stress with the arrangement of the fastening screws of the stem at different heights.

Preferably, according to the invention, the assembly system comprises an intermediate part between the stem and the head tube with lateral openings. This part will act as a cable guide such that the cables coming from the bicycle frame can be guided and taken to the outside through the side openings of said intermediate part. This arrangement is not possible with the known configuration of the state of the art wherein the compression mechanism with rings is located below the stem, preventing the integration of the cables.

For all these reasons, the recommended bicycle assembly system results in a system that is versatile and easily applicable to any bicycle headset, being easily installable and completely integrated inside of the stem in order to stay hidden, advantageously differentiating itself from the known systems.

DETAILED DESCRIPTION OF THE INVENTION

In light of the aforementioned figures, and in accordance with the adopted numbering, one may observe therein a preferred exemplary embodiment of the invention, which comprises the parts and elements indicated and described in detail below.

Figure 1:
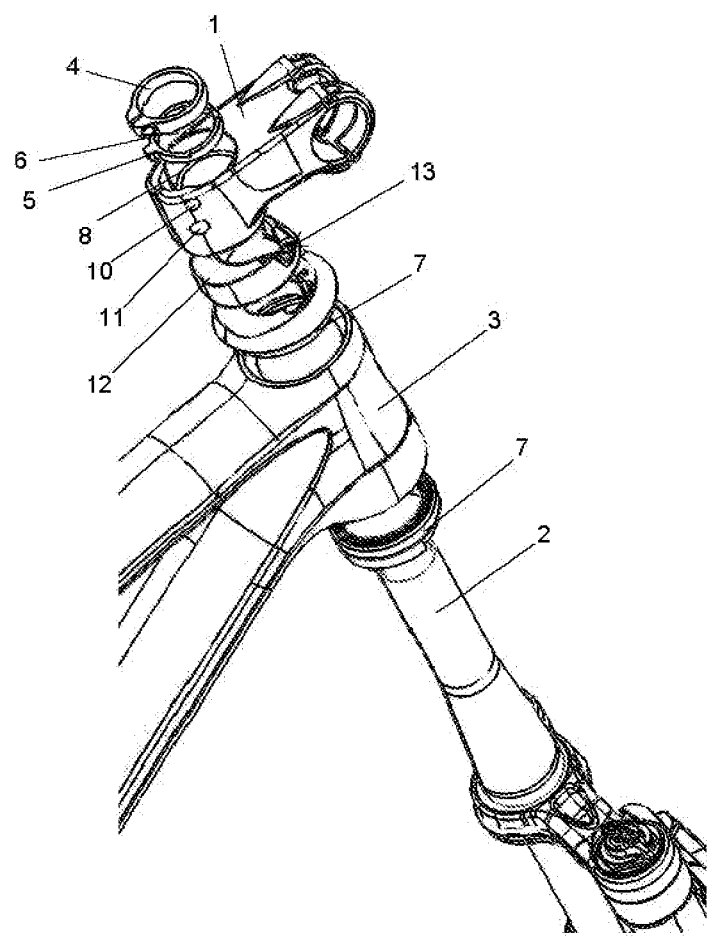
FIG. 1 shows an exploded perspective view of the system object of the invention.

FIG. 1 shows the elements which make up the headset of a bicycle. The purpose of the headset is to enable the rotation of a fork tube (2) on a head tube (3) which is connected to the bicycle frame for handling by means of a handlebar. To do so, it is necessary to use headset bearings (7). These headset bearings (7) are embedded in the head tube (3) such that the fastened portion of the bearing is fastened to said head tube (3) and the mobile portion facilitates the rotational movement of the fork tube (2) arranged therein. However, in order for these headset bearings (7) to not move, it is necessary to compress them, preventing the axial movement thereof.

For said compression, a stem (1) is used which is fastened in the fork tube (2) with the lower portion thereof in direct contact with the headset bearings (7) in order to prevent the movement thereof. However, if this compression is performed manually, by the user of the bicycle, there is play or clearance between the stem (1) and the headset bearings (7). The object of the present invention is to eliminate said clearance in a simple manner such that it can be carried out by the user of the bicycle.

Figure 2:
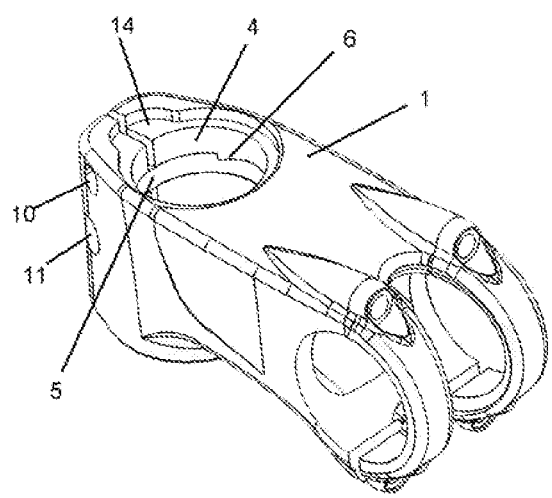
FIG. 2 shows a perspective view of a stem of the system object of the invention with a thrust ring and a retaining flange housed therein, in a position prior to the compression.

For said purpose, the headset assembly system for a bicycle of the present invention comprises a stem (1) radially fastenable by tightening to the fork tube (2) above the head tube (3). Such that in the first place, said stem (1) is pre-fastened by acting on screws, placed in the fastening holes (11) of the stem (1), without fully tightening, enabling a certain axial movement of the stem (1) with respect to the fork tube (2). Next, a thrust ring (5) and a retaining flange (4) in contact with each other are fitted inside of the stem (1), both fitting into the stem (1) up to a fitting stop (8), FIG. 2.

Figure 4:
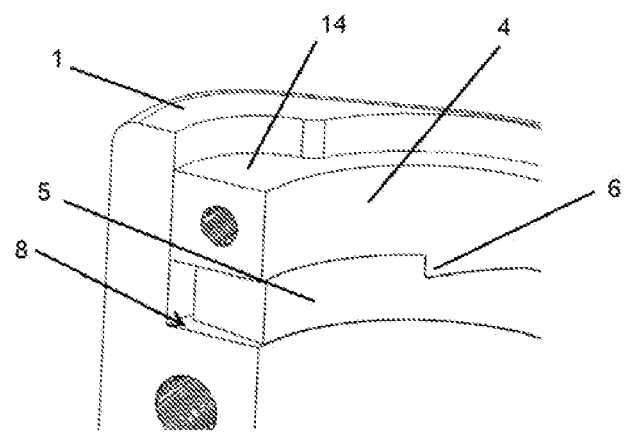
FIGS. 4 and 5 show a perspective view in detail, showing the thrust ring and retaining flange fitted into the stem, FIG. 4 being the situation prior to the compression, and FIG. 5 being the situation wherein the thrust ring has moved with respect to the retaining flange.

As seen in FIGS. 1 and 4, said fitting stop (8) acts as a stop for the thrust ring (5) and the retaining flange (4) such that both remain fitted inside of the stem (1) and fully integrated therein, such that aesthetically the compression mechanism made up of the flange (4) and the ring (5) are not visible, providing a better visual appearance for the bicycle, which today is one of the most relevant aspects when marketing bicycles. The fitting stop (8) can be, for example, a projection or preferably a recess with a larger diameter than the diameter of the hole of the stem (1) through which the fork tube (2) is received.

Figure 6:
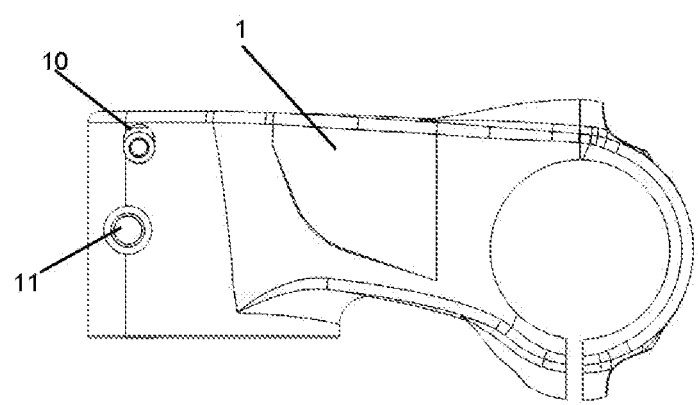
FIG. 6 shows a side view of the stem of the system object of the invention.

Once the thrust ring (5) and the retaining flange (4) are fitted with the stem (1) in pre-fastening, the retaining flange (4) is actuated on in order to fasten it radially by tightening to the fork tube (2). Preferably, the stem (1) has a fastening hole (10) (FIGS. 2 and 6), through which a screw is accessed for the threaded fastening of the retaining flange (4) which preferably has lugs (14) such that it remains radially fastened by tightening to the fork tube (2).

Figure 3:
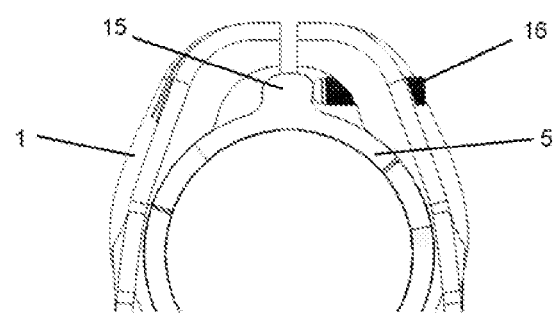
FIG. 3 shows a top view in detail, showing only the thrust ring inside of the stem without showing the retaining flange, so that the actuation mechanism on the thrust ring for applying the rotation thereof is seen.
Figure 7:
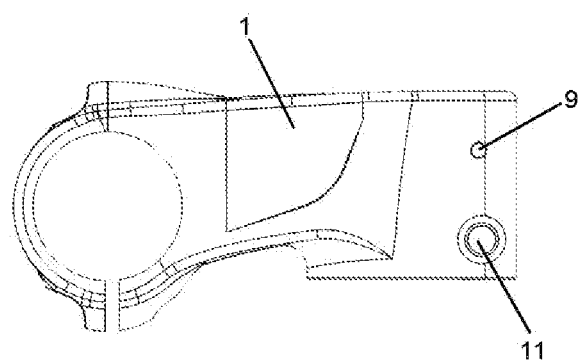
FIG. 7 shows a view of the other side of the stem of the system object of the invention.

Then, with the retaining flange (4) fastened, the thrust ring (5) is acted on in order to cause the rotation thereof. Preferably, the stem (1) has an adjustment hole (9) (FIG. 7), through which an adjustment screw (16) is accessed. As seen in FIG. 3, for the preferred embodiment, the adjustment screw (16) is acted on by pressing on the adjustment projection (15) in order to cause the rotation of the thrust ring (5). Said adjustment projection (15) projecting from the front of the thrust ring (5) is a preferred embodiment of the invention and may be any other type of projection which facilitates the rotation of the thrust ring (5).

Figure 5:
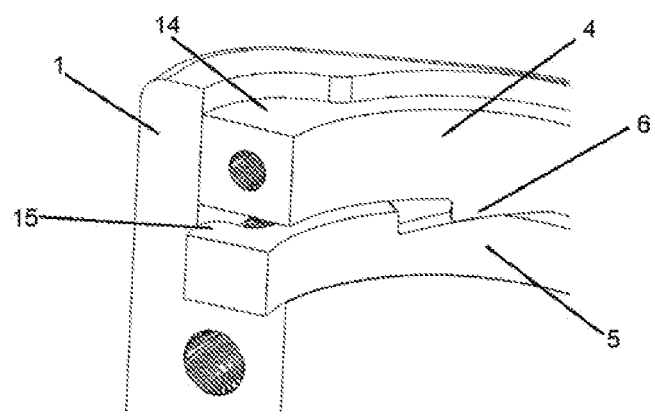

In relation to FIG. 4, the headset assembly system can be seen at the moment when the thrust ring (5) is fitted in the stem (1) abutting against the fitting stop (8), and with the retaining flange (4) with the entire surface thereof in contact with said thrust ring (5), at which time the retaining flange (4) remains fastened to the fork tube (2). Once the adjustment screw (16) has been actuated on as indicated above, the situation would be the one corresponding to FIG. 5, thus the rotation of the thrust ring (5) due to the action of at least one ramp (6) moves the thrust ring (5) with respect to the retaining flange (4), such that during the movement thereof it pushes the stem (1) when it hits the fitting stop (8). Said ramp (6) will preferably be configured as a sloping projection in the retaining flange (4) in correspondence with a sloping cavity in the thrust ring (5), the ramp (6) also being able to be in the ring (5) and the cavity in the flange (4) without altering the object of the invention.

In this manner, the clearance between the stem (1) and the headset bearings (7) is eliminated. However, in order to achieve a more effective fastening, if possible, the fastening screws of the stem (1) are completely fastened, which will preferably be screwed into holes (11) of the stem (1) positioned in opposite positions and at different heights, FIGS. 6 and 7. In this manner, a simple assembly is achieved eliminating the clearance and even enabling the adjustment screw (16) to be loosened since the headset would be fastened with the stem (1) and consequently more firmly than with the known embodiments wherein the small adjusting screw (16) supports all the stress.

Figure 8:
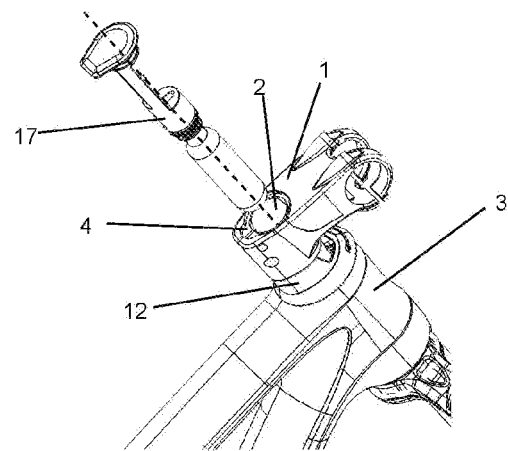
FIG. 8 shows a perspective view of the system object of the invention assembled and with a multi-tool which can be housed in the fork tube.

As seen in FIG. 8, with this assembly system, once the headset is fastened, by leaving the inside of the fork tube (2) free, it is possible to use it as storage, for example, for the insertion of a multi-tool device (17), such that it would stay inside of said fork tube (2) with the cap thereof adapted to fit in the stem (1), thus being easily accessible if the bicycle breaks down.

Figure 9:
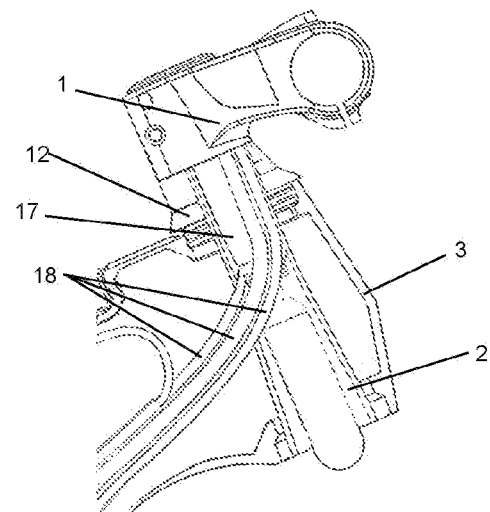
FIG. 9 shows a cross-sectional view wherein it shows the fork tube being used for cabling and the inclusion of a multi-tool.

Finally, another feature of the invention is that it is envisaged for the assembly system to comprise an intermediate part (12) between the stem (1) and the head tube (3) such that it is possible to pass the cables (18) which come from the bicycle frame through lateral openings (13) of said intermediate part (12) (FIG. 1), which is not possible in the known embodiments wherein adjustment rings are located between the stem (1) and the head tube (3). FIG. 9 shows how the cabling (18) runs through the inside of the head tube (3) without interfering with the multi-tool device (17).

The invention claimed is:

1. A headset assembly system for a bicycle comprising: a handlebar stem (1), radially fastenable by tightening to a fork tube (2) which is rotatable by means of headset bearings (7) with respect to a head tube (3) wherein the headset bearings (7) are fastened, a retaining flange (4), radially fastenable by tightening to the fork tube (2), a thrust ring (5), axially movable along the fork tube (2), wherein the retaining flange (4) and the thrust ring (5) are configured to contact each other by means of at least one ramp (6) which relates a rotation with a movement relative to each other, wherein the thrust ring (5) is arranged such that, when the thrust ring (5) is rotated around the fork tube (2) with the retaining flange (4) fastened to the fork tube (2), the thrust ring (5) moves with respect to the retaining flange (4) pushing the stem (1) against the headset bearings (7).

2. The headset assembly system for a bicycle according to claim 1, wherein the thrust ring (5) is arranged fitted inside of the stem (1) in contact with a fitting stop (8).

3. The headset assembly system for a bicycle according to claim 1, wherein the stem (1) has an adjustment hole (9) in order to act in the rotation of the thrust ring (5).

4. The headset assembly system for a bicycle according to claim 1, wherein the retaining flange (4) is arranged fitted inside of the stem (1).

5. The headset assembly system for a bicycle according to claim 1, wherein the stem (1) has a fastening hole (10) for threaded fastening of the retaining flange (4) to the fork tube (2).

6. The headset assembly system for a bicycle according to claim 2, wherein the stem (1) comprises holes (11) for threaded fastening of the stem.

7. The headset assembly system for a bicycle according to claim 1, further comprising an intermediate part (12) between the stem (1) and the head tube (3), configured as a cable guide.

8. A bicycle comprising the headset assembly system for a bicycle according to claim 1.

* * * * *